United States Patent
Shindou et al.

(10) Patent No.: US 6,958,009 B2
(45) Date of Patent: Oct. 25, 2005

(54) VEHICLE AIR CONDITIONER

(75) Inventors: Tomohide Shindou, Kariya (JP); Kouji Itou, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/921,035

(22) Filed: Aug. 18, 2004

(65) Prior Publication Data

US 2005/0059336 A1   Mar. 17, 2005

(30) Foreign Application Priority Data

Aug. 25, 2003   (JP) .............................. 2003-299902

(51) Int. Cl.⁷ .............................................. B60H 1/26
(52) U.S. Cl. ...................................... 454/139; 454/121
(58) Field of Search ................................ 454/121, 139; 165/142, 143

(56) References Cited

U.S. PATENT DOCUMENTS 6,554,695 B2 * 4/2003 Elliot .......................... 454/139
6,669,550 B1 * 12/2003 Urbank et al. .............. 454/156

* cited by examiner

*Primary Examiner*—Harold Joyce
(74) *Attorney, Agent, or Firm*—Harness, Dickey & Pierce, PLC

(57) ABSTRACT

A vehicle air conditioner has an air conditioning unit. The unit has a blower unit and an heat exchanger. The unit has a defroster outlet opening and an outside air inlet opening. The unit also has a switching door. The unit has a first passage between the defroster opening and an upstream side of the blower unit, and a second passage between the defroster outlet opening and a downstream side of the heat exchanger. During an inside air suction mode, the outside air inlet opening is closed, and the first passage is opened and the second passage is closed by the switching door. Thus, inside air is sucked through the defroster outlet opening during the inside air suction mode.

11 Claims, 7 Drawing Sheets

VEHICLE AIR CONDITIONER

CROSS REFERENCE TO RELATED APPLICATIONS

This application is based on Japanese Patent Application No. 2003-299902 filed on Aug. 25, 2003, the contents of which are incorporated herein by reference.

BACKGROUND OF THE INVENTION

1. Field of the Invention

The present invention relates to a vehicle air conditioner that has a downsized in-vehicle air conditioning unit.

2. Description of Related Art

FIGS. 6A, 6B show an in-vehicle air conditioning unit of a vehicle air conditioner. The air conditioning unit has a blower unit 15A and a conditioning body unit 16A. The blower unit 15A blows air to the conditioning body unit 16A. The conditioning body unit 16A adjusts temperature of the air blown from the blower unit 15A, and blows the conditioned air to a passenger compartment of a vehicle.

The conditioning body unit 16A is disposed in an instrumental panel 13, which is disposed in a front section of the passenger compartment 10, in a vicinity of a central position of a vehicle width direction. As shown in FIG. 6B, the blower unit 15A is disposed in a lateral area of the conditioning body unit 16A. In other words, the blower unit 15A is disposed in front of a seat of a passenger.

In such an arrangement, since the blower unit 15A is disposed to shift from the conditioning body unit 16A in the lateral area, an inside air inlet opening 40A of the blower unit 15A can be disposed in a certain place that is free from an obstruction, for example apart from a dashboard 12. Accordingly, it is easy to ensure enough area as an opening area of the inside air inlet opening 40A. Thus, it is easy to ensure maximum cooling capacity during an inside air suction mode.

However, it is required to prepare a large space from the front space of the passenger to the central position to mount the in-vehicle air conditioning unit in the instrument panel 13. Therefore, it is desired to reduce the mounting space of the air conditioning unit.

FIGS. 7A, 7B show another air conditioning unit of a comparison example that is considered by the inventors. The air conditioning unit has a blower unit 15B and a conditioning body unit 16B in a single conditioning housing 17B. The blower unit 15B has a blower fan 19. The conditioning body unit 16B has a heat exchanger. The blower unit 15B and the conditioning body unit 16B are disposed directly adjacent to each other in a front-and-rear direction of the vehicle so that the blower unit 15B and the conditioning body unit 16B are integrated in a single unit. In such an air conditioning unit, side space to mount the air conditioning unit can be significantly reduced.

In the comparison example, the air conditioning unit has an outside air inlet opening 22 and an inside air inlet opening 40B. The outside air inlet opening 22 is disposed above the inside air inlet opening 40B so that both ports 22, 40B face the dashboard 12. In such an arrangement, it is difficult to provide enough area of the inside air inlet opening 40B due to the outside air inlet opening 22 and peripheral devices in the instrument panel 13. In addition, the dashboard 12 may cause a shortage of the sucking air amount from the inside air inlet opening 40B because the dashboard functions as an obstruction (resistance). This reduces a maximum cooling capacity in a condition of the inside air suction mode.

SUMMARY OF THE INVENTION

An object of the present invention is to provide a vehicle air conditioner that is downsized and ensures adequate sucking air amount of inside air.

According to one aspect of the present invention, the vehicle air conditioner has a blower unit, a heat exchanger, a first outlet, a second outlet, an outside air inlet, and changing means. The blower unit blows air toward a passenger compartment. The heat exchanger exchanges heat with the air blown by the blower unit. Outside air is sucked from the outside air inlet toward an upstream side of the blower unit. The air passed through the heat exchanger is blown toward a first space of the passenger compartment through the first outlet. The air passed through the heat exchanger is also blown toward a second space of the passenger compartment through the second outlet.

The blower unit and the heat exchanger are disposed adjacent to each other to be a single assembled component. The changing means changes a connection of the second outlet to one of an upstream side of the blower unit and the downstream side of the heat exchanger.

During an inside air suction mode, the outside air inlet is closed, and the changing means connects between the second outlet and the upstream side of the blower unit and it disconnects between the second outlet and the downstream side of the heat exchanger.

On the other hand, during an outside air suction mode, the outside air suction is opened, and the changing means connects between the second outlet and the downstream side of the heat exchanger and it disconnects between the second outlet and the upstream side of the blower unit.

Since the blower unit and the heat exchanger are disposed adjacent to each other to be a single assembled component, the air conditioning unit for the vehicle air conditioner can be reduced in size and mounting space of the air conditioning unit can be significantly reduced.

In addition, during the inside air suction mode, the inside air can be sucked in the upstream side of the blower unit through the second outlet, which has existed to be used as the outlet duct. Here, the outlets including the first outlet and the second outlet can be disposed apart from a dashboard and the outside air inlet because the outlets are disposed downstream of the heat exchanger. Accordingly, it is easy to ensure an area of a second outlet opening for the second outlet. Thus, there is not any problems about raising air resistance by the dashboard during the inside air suction mode. Therefore, the sucking air amount of the inside air can be ensured through the second outlet. That is, the vehicle air conditioner can ensure the sucking air amount of the inside air and can be downsized.

On the other hand, during the outside air suction mode, the outside air can be sucked through the outside air inlet to the upstream side of the blower unit. The second outlet is connected to the downstream side of the heat exchanger. Thus, the air passed through the heat exchanger can be blown out through the second outlet.

In addition, the single assembled component means a component that can be mounted on the vehicle as a single assembly, which has been assembled before mounting on the vehicle.

According to another aspect of the present invention, the vehicle air conditioner has a housing, a blower unit, a heat exchanger, and changing means. The housing has a first outlet opening, a second outlet opening, and an outside air inlet opening. The blower unit and the heat exchanger are disposed adjacent to each other as a single assembled component in the housing. The changing means changes a connection of the second outlet opening to one of an upstream side of the blower unit and the downstream side of the heat exchanger.

During an inside air suction mode, the outside air inlet opening is closed, and the changing means connects between the second outlet opening and the upstream side of the blower unit and it disconnects between the second outlet opening and the downstream side of the heat exchanger. On the other hand, during an outside air suction mode, the outside air inlet opening is opened, and the changing means connects between the second outlet opening and the downstream side of the heat exchanger and it disconnects between the second outlet opening and the upstream side of the blower unit.

In such a vehicle air conditioner, the heat exchanger and the blower unit are disposed as the single assembled component in the housing. In addition, during the inside air suction mode, the inside air can be sucked in the upstream side of the blower unit through the second outlet opening, which has existed to be used as the outlet opening. Accordingly, as described in the first aspect of the present invention, the vehicle air conditioner can ensure the sucking air amount of the inside air and can be downsized.

According to another aspect of the present invention, the vehicle air conditioner has a housing, a partition, a blower fan, a heat exchanger, and a switching door. The partition divides the housing into a first room and a second room. The blower fan is disposed in the first room. The heat exchanger is disposed in the second room. The housing has an outside air inlet opening, a first outlet opening, a second outlet opening, a first passage, and a second passage. The first passage connects the second outlet opening and the first room. The second passage connects the second outlet opening and the second room. The switching door changes conditions of the first passage and the second passage so that one of the first passage and the second passage is opened an the other is closed.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

Figure 1A:
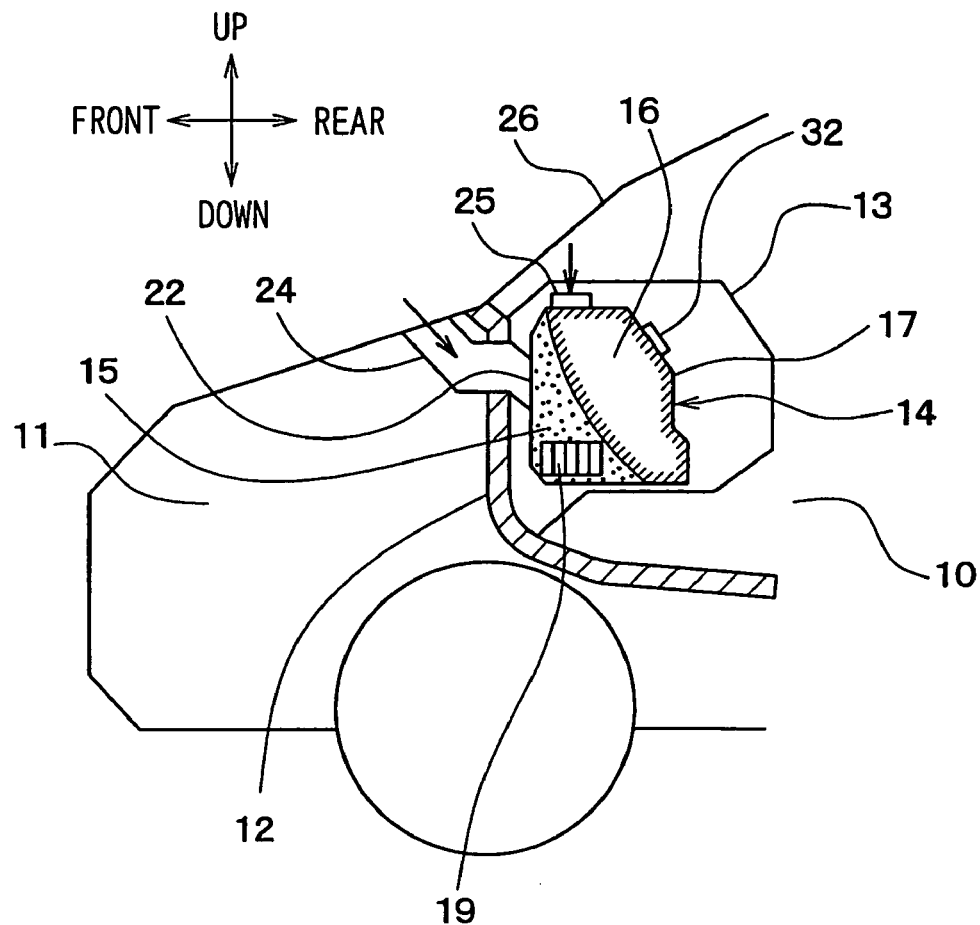
FIG. 1A is a cross-sectional view showing an in-vehicle air conditioning unit of a vehicle air conditioner mounted in a vehicle according to a first embodiment of the present invention.

The preferred embodiments of the present invention will be explained with reference to the accompanying drawings. In the drawing, the same numerals are used for the same components and devices.

[First Embodiment]

As shown in FIG. 1A, a vehicle has a dashboard 12 to divide a passenger compartment 10 from an engine room 11. The passenger compartment 10 has an instrument panel 13, which is disposed in a front section of the passenger compartment 10. A vehicle air conditioner has an in-vehicle air conditioning unit 14. The in-vehicle air conditioning unit 14 is disposed at a vicinity of a central position of a vehicle width direction in the instrument panel 13.

The air conditioning unit 14 has a blower unit 15 and a conditioning body unit 16. The blower unit 15 blows air to the conditioning body unit 16. The conditioning body unit 16 adjusts temperature of the air blown from the blower unit 15, and blows the conditioned air to the passenger compartment 10. In detail, the air conditioning unit 14 has a single resinous conditioning housing 17 that has a box shape. The blower unit 15 and the conditioning body unit 16 are disposed directly adjacent to each other in the conditioning housing 17. The blower unit 15 and the conditioning body unit 16 are integrated as a single assembled component.

The blower unit 15 is disposed in the front part of the conditioning housing 17. The conditioning body unit 16 is disposed in the rear part of the conditioning housing 17, which is the rear of the blower unit 15. The conditioning housing 17 has a partition 46 that divides the conditioning housing 17 into the blower unit 15 and the conditioning body unit 16.

The resinous conditioning housing 17 has a plurality of separated housings, which are formed separately from each other for various reasons, such as convenience for resin molding and assembling various kinds of parts in the conditioning housing 17. The plurality of separated housings are integrated into the conditioning housing 17 by connecting means, such as a screw, and a metal spring clip.

Figure 2:
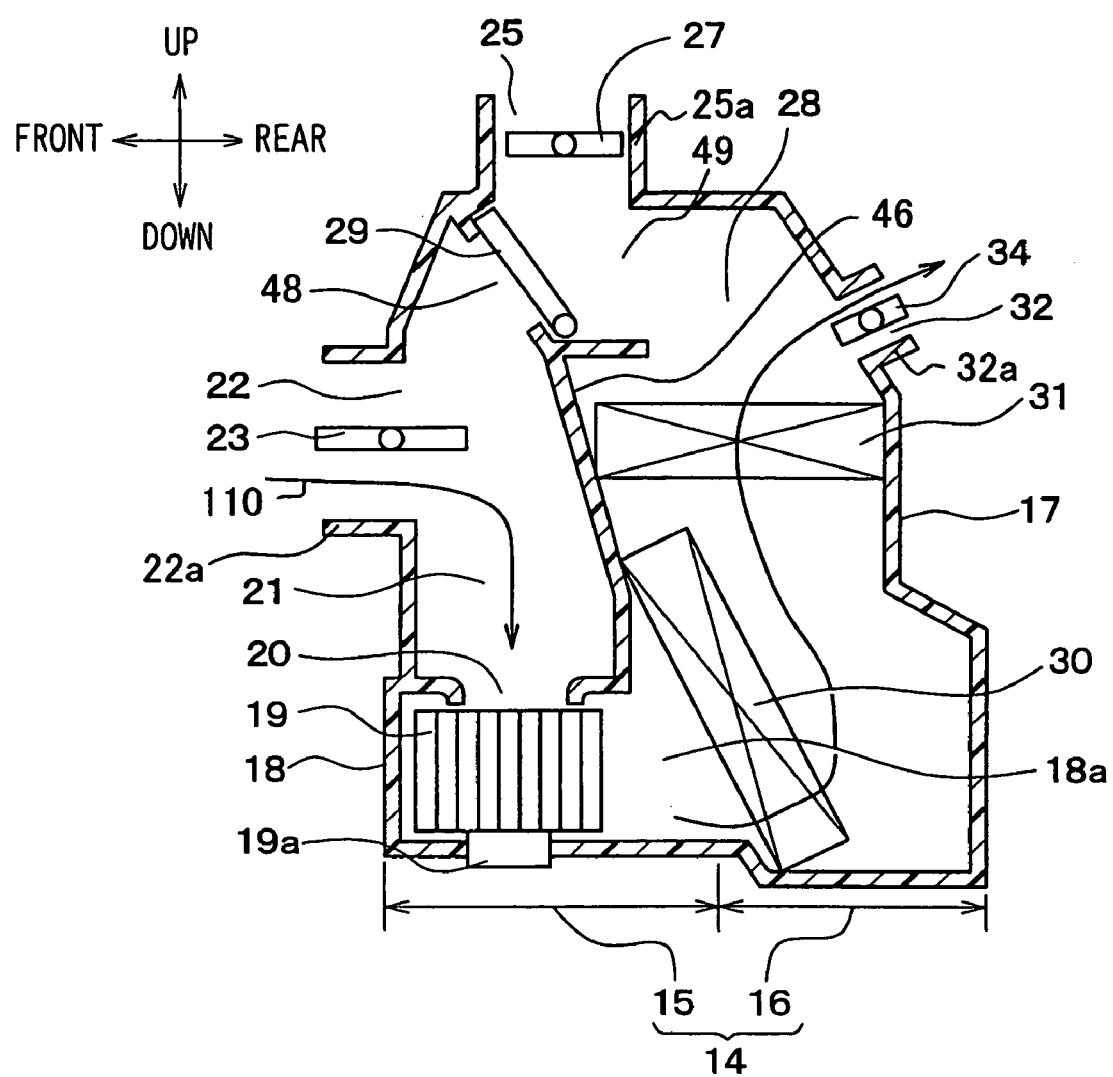
FIG. 2 is a cross-sectional view showing the air conditioning unit with an airflow during an outside air suction mode of the air conditioning unit according to the first embodiment.
Figure 3:
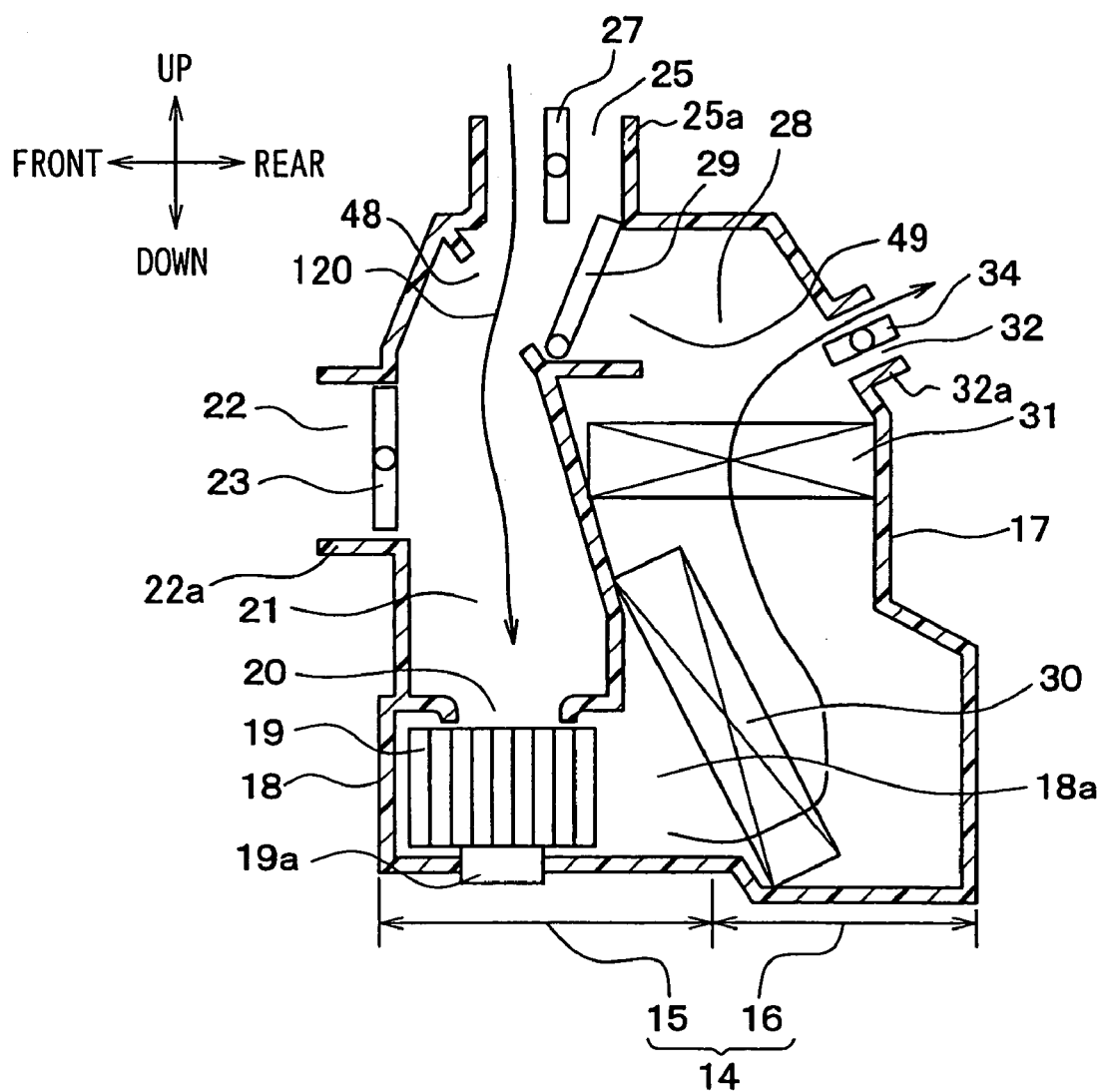
FIG. 3 is a cross-sectional view showing the air conditioning unit with an airflow during an inside air suction mode of the air conditioning unit according to the first embodiment.

Next, the blower unit 15 will be explained in detail. As shown in FIGS. 2, 3, the conditioning housing 17 has a scroll casing 18 in a lower front part of the conditioning housing 17. The blower unit 15 has a centrifugal blower fan 19, a blower motor 19a, and a bell-mouth suction port 20. The centrifugal blower fan 19 is rotatably disposed in the scroll casing 18 so that a rotational axis of the blower fan 19 is in the vertical direction. The blower motor 19a drives the centrifugal blower fan 19. The blower motor 19a is disposed under the blower fan 19. The bell-mouth suction port 20 is disposed above the blower fan 19.

The blower unit 15 has a suction passage 21 and an outside air inlet (pipe) 22a. The suction passage 21 is formed above the bell-mouth suction port 20 in the conditioning housing 17 so that the suction passage 21 extends to the vertical direction. The outside air inlet 22a has a outside air inlet opening 22 that is an opening of the conditioning housing 17. The outside air inlet opening 22 is formed above the bell-mouth suction port 20 on the front sidewall of the conditioning housing 17 so that the outside air inlet opening 22 is connected to the suction passage 21.

An outside air switching door 23, which consists of a butterfly valve, is rotatably disposed in the outside air inlet opening 22 to open and close the outside air inlet opening 22. Outside air is sucked through the outside air inlet opening 22 and an outside air suction duct 24 as shown in FIG. 1A.

The conditioning housing 17 has a defroster outlet (pipe) 25a that has a defroster outlet opening 25 disposed on the top wall of the conditioning housing 17. The defroster outlet opening 25 is connected to a defroster duct, which is not shown. The air is blown toward an inside surface of a windshield 26 from a defroster blowing port (not shown) that is provided at an end of the defroster duct.

In this embodiment, the defroster outlet opening 25 is connected to an upper part of the suction passage 21 so that the defroster outlet opening 25 can be used as an inside air inlet opening. A defroster door 27, which consists of a butterfly valve, is rotatably disposed in the defroster outlet opening 25 to open and close the defroster outlet opening 25.

The defroster outlet opening 25 is also connected to a blowing-out passage 28, through which the conditioned air adjusted by the conditioning body unit 16 flows. An outside/inside air switching door 29, which consists of a plate door, is rotatably disposed under the defroster outlet opening 25 to switch a connecting condition. The connecting condition has a first state and a second state. In the first state, a first air passage 48 between the defroster outlet opening 25 and the suction passage 21 is opened so that the defroster outlet opening 25 is connected to the suction passage 21 as shown in FIG. 3. In the second state, a second air passage 49 between the defroster outlet opening 25 and the blowing-out passage 28 is opened so that the defroster outlet opening 25 is connected to the blowing-out passage 28 as shown in FIG. 2.

Next, the conditioning body unit 16 will be explained in detail. A blowing-out part 18a of the scroll casing 18 is formed toward the rear of the vehicle and is connected to a lower space of the conditioning body unit 16 in the conditioning housing 17. A cooling heat exchanger 30 is disposed in the lower space of the conditioning body unit 16 in a slant condition that the cooling heat exchanger 30 slants to the front of the vehicle at an angle of some degrees with the vertical.

The cooling heat exchanger 30 is a well known evaporator, which is a part of a refrigerant cycle. The evaporator cools air passing therethrough by absorbing evaporative latent heat of refrigerant from the air. The cooling heat exchanger 30 has a heat exchanging core. The heat exchanging core has a plurality of flat tubes (not shown) and corrugate fins (not shown). The flat tubes are arranged to extend in the vertical direction in parallel with each other. The corrugate fins are connected between adjacent two flat tubes so that the corrugate fins and the flat tubes are integrated. The air flows through air gaps of the heat exchanging core from the front part toward the rear part of the housing 17.

A heating heat exchanger 31 is disposed in a substantially horizontal direction above the cooling heat exchanger 30 in the conditioning body unit 16, which is downstream of the cooling heat exchanger 30. The heating heat exchanger is a well known heater core, which heats the air by using hot water (coolant of a vehicle engine) supplied from the engine as a heat source.

The heating heat exchanger 31 also has a heat exchanging core. The heat exchanging core has a plurality of flat tubes (not shown) and corrugate fins (not shown). The flat tubes are arranged to extend in the vertical direction in parallel with each other. The corrugate fins are connected between adjacent two flat tubes so that the corrugate fins and the flat tubes are integrated. The air flows through air gaps of the heat exchanging core from a lower part toward an upper part.

The conditioned air blowing into the passenger compartment 10 can be set to a certain temperature by adjusting heat amount of the heating heat exchanger 31 for the air flown through the cooling heat exchanger 30. A heat amount adjusting system (not shown) for adjusting the heat amount for the air can be carried out by an air-mix system or a hot water control system. The air mix system has an air mix door to adjust an airflow ratio between the quantity of hot air flowing through the heating heat exchanger 31 and the quantity of cold air bypassing the heating heat exchanger 31. The hot water control system adjusts quantity of hot water flowing through the heating heat exchanger 31 or temperature of the hot water flowing through the heating heat exchanger 31.

The blowing-out passage 28 is formed above the heating heat exchanger 31 (downstream of the heating heat exchanger 31) in the conditioning body unit 16. The conditioned air, temperature of which is adjusted by the heat amount adjusting system, flows through the blowing-out passage 28.

The blowing-out passage 28 is connected to face outlet openings 32 and foot outlet openings 33 as well as the defroster outlet opening 25. The conditioned air is blown out to a certain space of the passenger compartment 10 through one or more of the openings 25, 32, and 33. The conditioning housing 17 has face outlets (pipes) 32a that have respective face outlet openings 32. The conditioning housing 17 also has foot outlets (pipes) 33a that have respective foot outlet openings 33. The face outlet openings 32 are disposed on an upper part of a rear sidewall of the conditioning housing 17. The face outlet openings 32 are connected to respective face ducts (not shown) to blow out the conditioned air to an upper body of a passenger. Face doors 34, which consist of butterfly valves, are rotatably disposed in the face outlet openings 32 to open and close the face outlet openings 32.

Figure 1B:
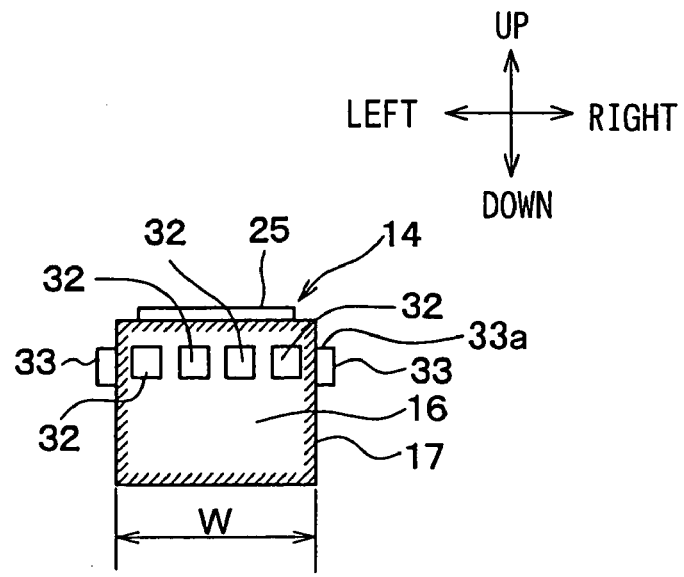
FIG. 1B is a front view showing the air conditioning unit when viewed from a rear of the vehicle (from a passenger side) according to the first embodiment.

The foot outlet openings 33 are disposed on upper parts of right and left sidewalls of the conditioning housing 17 as shown in FIG. 1B. The foot outlet openings 33 are connected to foot ducts (not shown) to blow out the conditioned air to foot area of the passenger. Foot doors (not shown) are also rotatably disposed in the foot outlet openings 33 to open and close the foot outlet openings 33.

Next, the door operational system will be explained. The door operational system has an inside/outside air (suction mode) switching system and an air outlet mode switching system. The outside air switching door 23 is operated by the inside/outside air switching system. The face doors 34 and the foot doors (not shown) are operated by the air outlet mode switching system. On the other hand, the defroster door 27 and the switching door 29 are operated by both of the inside/outside air switching system and the air outlet mode switching system. In other words, the defroster door 27 and the switching door 29 are operated to switch the suction mode and the air outlet mode. The switching systems have actuators, which use servomotors.

Width directions of the heat exchangers 30, 31 are in a vertical direction that is perpendicular to the airflow. In other words, the width directions of the heat exchangers 30, 31 are perpendicular to the paper of FIGS. 2, 3. In other words, the width directions are a vehicle width direction (a right-and-left direction of the vehicle). At least the cooling heat exchanger 30 of the heat exchangers 30, 31 is set to have a substantially equal width to a width W of the conditioning housing 17 (see FIG. 1B). The cooling heat exchanger 30 is disposed across entire width of an internal space of the conditioning housing 17. Components 18, 19, 19a of the blower unit 15 are disposed within the width of the cooling heat exchanger 30 at the upstream side of the cooling heat exchanger 30.

Next, operation of the air conditioning unit 14 will be explained. FIG. 2 shows the air conditioning unit 14 in a condition of an outside air suction mode for sucking the outside air. During the outside air suction mode, the outside air inlet opening 22 is opened by the outside air switching door 23, and the first air passage 48 between the defroster outlet opening 25 and the suction passage 21 is closed and the second air passage 49 between the defroster outlet opening 25 and the blowing-out passage 28 is opened by the switching door 29.

The conditioning unit 14 has an air outlet mode that has the face mode, a bi-level (B/L) mode, a foot mode, a foot/defroster mode, and a defroster mode. In the condition of FIG. 2, the face mode is set as the air outlet mode. In the face mode, the face outlet openings 32 are opened by the face doors 34. The defroster outlet opening 25 is closed by the defroster door 27. The foot outlet openings 33 are closed by the foot doors (not shown).

Accordingly, during the outside air suction mode, the outside air is sucked to the suction passage 21 through the outside air suction duct 24 and the outside air inlet opening 22 as shown by the arrow 110 in FIG. 2 while the blower fan 19 is rotatably driven by turning on the blower motor 19a.

The outside air is blown to the upstream side of the cooling heat exchanger 30 (the front direction of the vehicle) though the inside of the scroll casing 18. The outside air then passes through the cooling heat exchanger 30. The outside air is cooled to be the cooled air in the cooling heat exchanger 30. The cooled air is adjusted in temperature by adjusting heat amount of the heating heat exchanger 31. The temperature adjusted cooled air (conditioned air) is blown toward the upper half of the passenger in the passenger compartment 10 though the blowing-out passage 28 and the face outlet openings 32.

When the bi-level mode is set during the outside air suction mode, both of the face outlet openings 32 and the foot outlet openings 33 are opened. Accordingly, the conditioned air is blown toward feet of the passenger in the passenger compartment 10 through the foot outlet openings 33 while the conditioned air is blown toward the upper half of the passenger in the passenger compartment 10 though the face outlet openings 32.

When the foot mode is set during the outside air suction mode, the foot outlet openings 33 are opened. Accordingly, the conditioned air (warm air) is blown toward the feet of the passenger in the passenger compartment 10 through the foot outlet openings 33.

When the foot/defroster mode is set during the outside air suction mode, both of the foot outlet openings 33 and the defroster outlet opening 25 are opened. Accordingly, the conditioned air (warm air) is blown toward the inside surface of the windshield 26 in the passenger compartment 10 through the defroster outlet opening 25 while the conditioned air (warm air) is blown toward feet of the passenger in the passenger compartment 10 through the foot outlet openings 33.

When the defroster mode is set during the outside air suction mode, the defroster outlet opening 25 is opened. Accordingly, the conditioned air (warm air) is blown toward the inside surface of the windshield 26 in the passenger compartment 10 through the defroster outlet opening 25.

FIG. 3 shows the air conditioning unit 14 in a condition of an inside air suction mode for sucking the inside air. During the inside air suction mode, the outside air inlet opening 22 is closed by the outside air switching door 23, and the first air passage 48 between the defroster outlet opening 25 and the suction passage 21 is opened and the second air passage between the defroster outlet opening 25 and the blowing-out passage 28 is closed by the switching door 29.

In the condition of FIG. 3, the face mode is set as the air outlet mode. In the face mode, the face outlet openings 32 are opened by the face doors 34, and the foot outlet openings 33 are closed by the foot doors. Accordingly, the inside air is sucked to the suction passage 21 through the defroster outlet opening 25 as shown by the arrow 120 in FIG. 3 while the blower fan 19 is rotatably driven by turning on the blower motor 19a.

The inside air is blown to the cooling heat exchanger 30 through the inside of the scroll casing 18. The inside air passes through the cooling heat exchanger 30, and the inside air is cooled to be the cooled air in the cooling heat exchanger 30. The cooled air is adjusted in temperature by adjusting heat amount of the heating heat exchanger 31. The temperature adjusted cooled air (conditioned air) is blown toward the upper half of the passenger in the passenger compartment 10 through the blowing-out passage 28 and the face outlet openings 32.

The bi-level mode and the foot mode can be set during the inside air suction mode as during the outside air suction mode. However, the conditioned air cannot be blown from the defroster outlet opening 25 during the inside air suction mode because the switching door 29 closes the second air passage 49 between the defroster outlet opening 25 and the blowing-out passage 28. Accordingly, the foot/defroster mode and the defroster mode cannot be set during the inside air suction mode.

However, it is required to suck outside air, which has lower absolute humidity than inside air, during the foot/defroster mode and the defroster mode to get a certain defrosting performance by blowing warm air. In other words, it is unusual to set the foot/defroster mode and the defroster mode during the inside air suction mode to maintain the defrosting performance.

Accordingly, the air conditioning unit 14 does not have a substantial disadvantage even though the foot/defroster mode and the defroster mode cannot be set during the inside air suction mode.

The air conditioning unit 14 has following effects.

(1) The blower unit 15 and the conditioning body unit 16 are disposed directly adjacent to each other and integrated as the single assembled component in the single conditioning housing 17, which has the box shape. Therefore, the air conditioning unit 14 can be reduced in size, and mounting space that is required to mount the air conditioning unit 14 in the vehicle can be reduced.

In particular, the mounting space for the air conditioning unit 14 can be significantly reduced in the width direction.

This is because the blower unit 15 is disposed in the front part of the conditioning housing 17, and the conditioning body unit 16 is disposed adjacent to the blower unit 15 in the rear part of the conditioning housing 17.

(2) The defroster outlet opening 25 is used as the inside air inlet opening during the inside air suction mode. Therefore, it is not required to provide a special inlet opening to suck the inside air. In addition, the defroster outlet opening 25 is disposed on the top surface of the conditioning housing 17 to blow the conditioned air toward the windshield 26. Accordingly, the defroster outlet opening 25, which is used as the inside air inlet opening during the inside air suction mode, can be disposed apart from the dashboard 12 and the outside air inlet opening 22.

Thus, a certain opening area for the defroster outlet opening 25 can be ensured easily. In addition, this structure of the air conditioning unit 14 does not cause a problem that air resistance for sucking the inside air increases during the inside air suction mode due to the dashboard 12 since the defroster outlet opening 25 is apart from the dashboard 12. As a result, the certain air amount can be sucked through the defroster outlet opening 25. Therefore, the mounting space for the air conditioning unit 14 can be reduced in size, and required air amount can be sucked.

(3) The air conditioning unit 14 improves warm feeling of the passenger during heating in winter during the inside air suction mode because the inside air is sucked through the defroster outlet opening 25.

Figure 4:
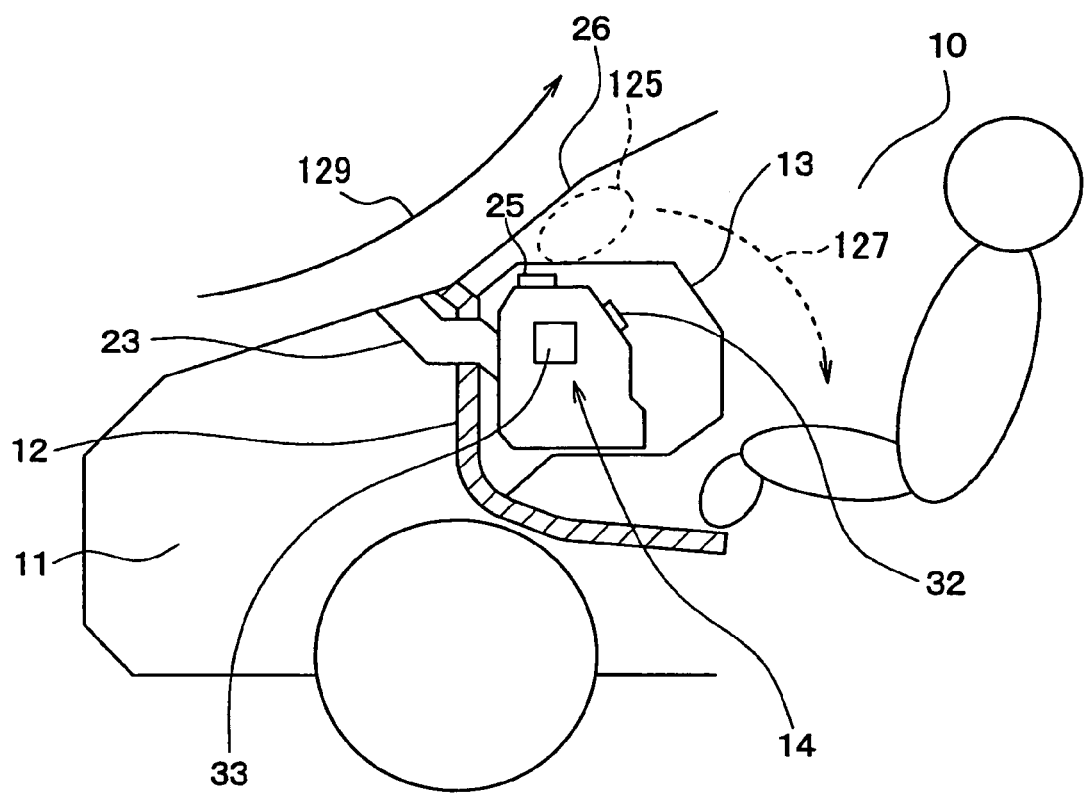
FIG. 4 is a cross-sectional view for explaining an operational effect of the air conditioning unit according to the first embodiment.

As shown in FIG. 4, at the time of heating in winter, the inside air becomes cool when the inside air contacts with the windshield 26 because the temperature of the windshield 26 is as low as the outside cold air 129. FIG. 4 also shows the cool air area 125. The cool air flows down toward a lap of the passenger as shown by the arrow 127 because of a difference between the air densities of cool air and warm air. This might cause an uncomfortable feeling of the passenger.

However, according to the air conditioning unit 14 of the first embodiment, the cool air of the cool air area. 125 can be sucked into the defroster outlet opening 25 because the inside air is sucked through the defroster outlet opening 25. Therefore, the airflow 127 can be prevented, and warm feeling of the passenger can be improved.

[Second Embodiment]

Figure 5:
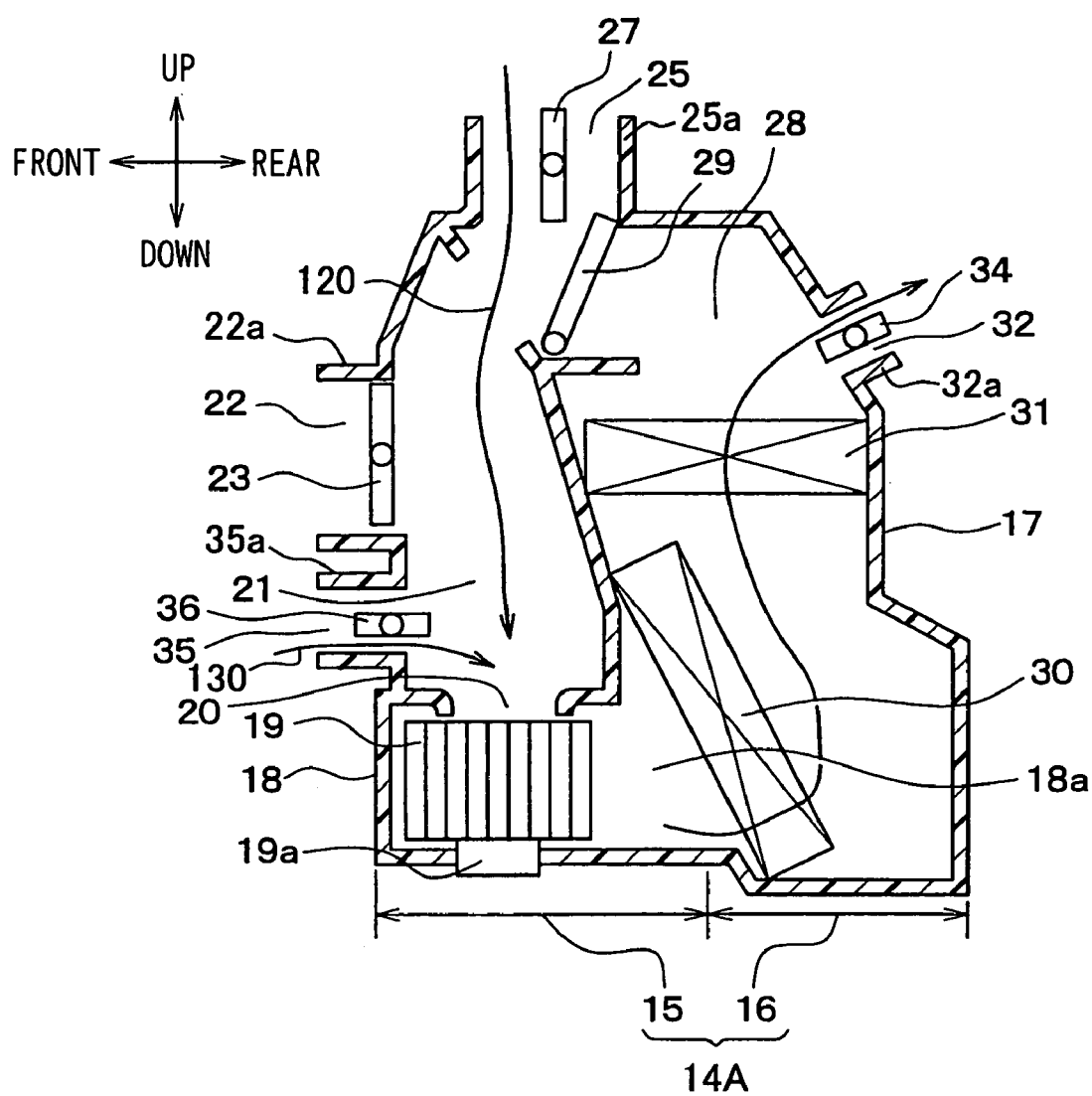
FIG. 5 is a cross-sectional view showing an in-vehicle air conditioning unit mounted in a vehicle according to a second embodiment of the present invention.
Figure 6A:
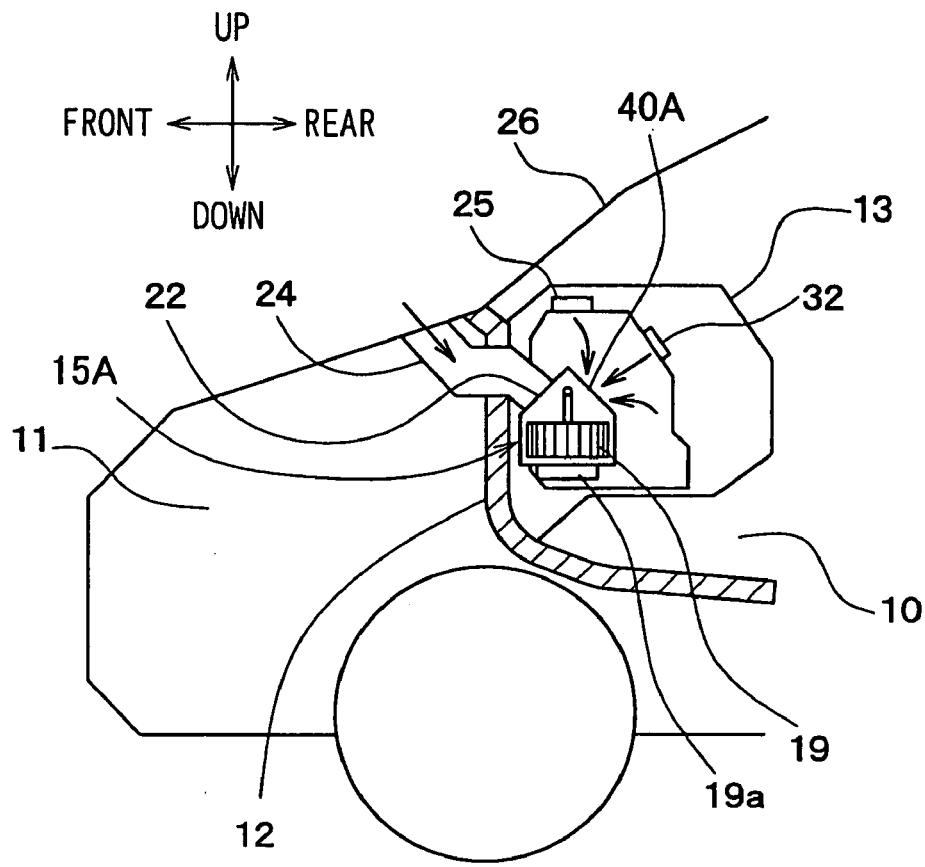
FIG. 6A is a cross-sectional view showing an in-vehicle air conditioning unit mounted in a vehicle according to a related art.
Figure 6B:
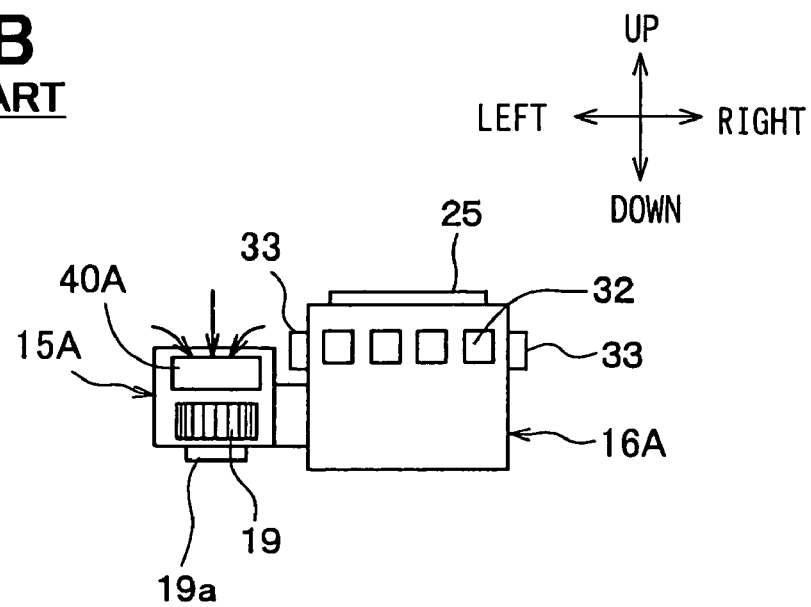
FIG. 6B is a front view showing the air conditioning unit when viewed from a rear of the vehicle (from a passenger side) according to the related art.
Figure 7A:
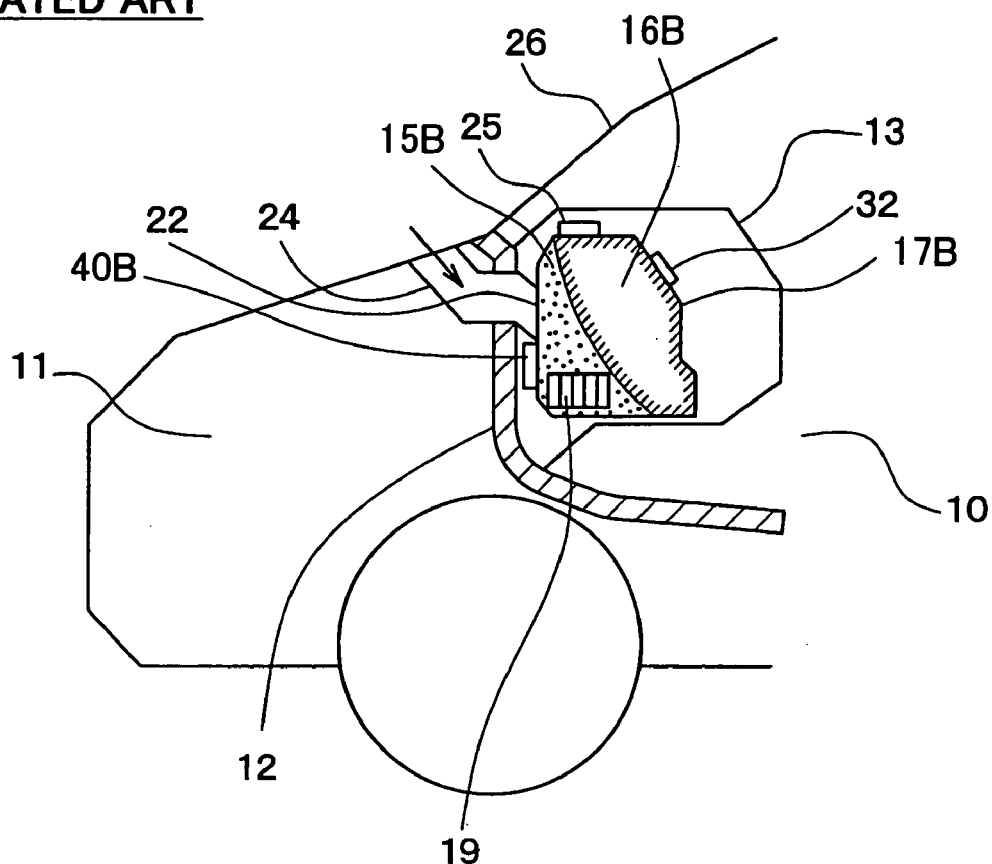
FIG. 7A is a cross-sectional view showing an in-vehicle air conditioning unit mounted in a vehicle according to a comparison example.
Figure 7B:
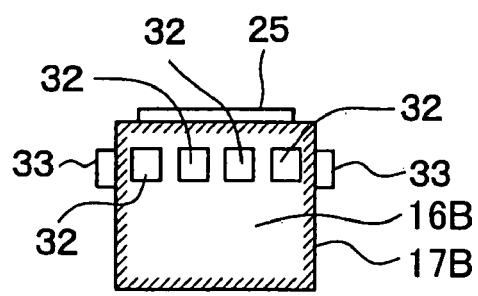
FIG. 7B is a front view showing the air conditioning unit when viewed from a rear of the vehicle (from a passenger side) according to the comparison example.

FIG. 5 shows another in-vehicle air conditioning unit 14A of the second embodiment during the inside air suction mode. The air conditioning unit 14A has an auxiliary inside air inlet 35a and an auxiliary inside air switching door 36 in addition to the components of the air conditioning unit 14 of the first embodiment.

The auxiliary inside air inlet 35a has an auxiliary inside air inlet opening 35 that is disposed below the outside air inlet opening 22 on the front sidewall of the conditioning housing 17 so that the auxiliary inside air inlet opening 35 is connected to the suction passage 21. The auxiliary inside air switching door 36, which consists of a butterfly valve, is rotatably disposed in the auxiliary inside air inlet opening 35 to open and close the auxiliary inside air inlet opening 35.

According to the second embodiment, the inside air is sucked to the suction passage 21 through the auxiliary inside air inlet opening 35 as shown by the arrow 130 as well as through the defroster outlet opening 25 as shown by the arrow 120 during the inside air suction mode. This increases the suctioning air of the inside air. Accordingly, maximum cooling capacity is increased by increasing the blowing air amount toward the passenger compartment in a condition that a maximum cooling is set during the inside air suction mode.

The present invention should not be limited to the embodiments discussed above and shown in the figures, but may be implemented in various ways without departing from the spirit of the invention.

For example, in the second embodiment, the auxiliary inside air inlet opening is disposed below the outside air inlet opening 22. However, it can be disposed above the outside air inlet opening 22 on the front sidewall of the conditioning housing 17.

The vehicle air conditioner can have a second face outlet opening and a diffusion outlet opening in addition to the defroster outlet opening 25, the face outlet openings 32, and the foot outlet openings 33. The second face outlet opening is disposed above the positions of the face outlet openings 32 on the rear sidewall of the conditioning housing 17 to blow the cooled air toward a backseat of the passenger compartment. The diffusion outlet opening, which has a long narrow shape extending to the right-and-left direction of the vehicle, is disposed on the upper part of the conditioning housing 17 to softly blow the cooled air by spreading the cooled air.

In such a situation, the second face outlet opening and the diffusion outlet opening can be also used as the inside air inlet opening like the defroster outlet opening 25 of the above embodiments. That is, the inside air inlet opening can be performed by different kinds of outlet openings instead of a single outlet opening. In addition, another outlet opening other than the defroster outlet opening 25, such as the face outlet openings 32, can be also used as the inside air inlet opening.

What is claimed is:

1. A vehicle air conditioner comprising:
   a blower unit that blows air toward a passenger compartment;
   a heat exchanger that exchanges heat with the air blown by the blower unit;
   a first outlet through which the air passed through the heat exchanger is blown toward a first space of the passenger compartment;
   a second outlet through which the air passed through the heat exchanger is blown toward a second space of the passenger compartment;
   an outside air inlet from which outside air is sucked into an upstream side of the blower unit; and
   changing means for changing a connection of the second outlet to one of the upstream side of the blower unit and a downstream side of the heat exchanger; wherein:
   the blower unit and the heat exchanger are disposed adjacent to each other to be a single assembled component,
   the outside air inlet is closed and the changing means connects between the second outlet and the upstream side of the blower unit and disconnects between the second outlet and the downstream side of the heat exchanger during an inside air suction mode where inside air is sucked into the upstream side of the blower unit, and
   the outside air inlet is opened and the changing means connects between the second outlet and the downstream side of the heat exchanger and disconnects between the second outlet and the upstream side of the blower unit during an outside air suction mode where the outside air is sucked into the upstream side of the blower unit.

2. The vehicle air conditioner according to claim 1, wherein:
   the blower unit is disposed upstream of the heat exchanger, and the blower unit is disposed within a width of the heat exchanger in a condition that a width direction of the heat exchanger is perpendicular to an airflow flowing through the heat exchanger.

3. The vehicle air conditioner according to claim 1, wherein:
the first outlet is at least one of a face outlet where the conditioned air flows toward an upper body of a passenger in the passenger compartment and a foot outlet where the conditioned air flows toward a foot of the passenger in the passenger compartment, and
the second outlet is a defroster outlet where the conditioned air flows toward an inside surface of a windshield.

4. The vehicle air conditioner according to claim 1, further comprising:
an auxiliary inside air inlet from which the inside air is sucked into the upstream side of the blower unit.

5. A vehicle air conditioner comprising:
a housing that air blowing toward a passenger compartment flows in;
a heat exchanger that exchanges heat with the air so that the air becomes conditioned air; and
a blower unit that blows the air toward the passenger compartment through the heat exchanger, wherein:
the heat exchanger and the blower unit are disposed adjacent to each other as a single assembled component in the housing;
the housing includes:
a first outlet opening through which the conditioned air is blown toward a first space of the passenger compartment,
a second outlet opening through which the conditioned air is blown toward a second space of the passenger compartment,
an outside air inlet opening from which outside air is sucked into an upstream side of the blower unit, and
change means for changing a connection of the second outlet opening to one of the upstream side of the blower unit and a downstream side of the heat exchanger;
the outside air inlet opening is closed and the change means connects between the second outlet opening to the upstream side of the blower unit and disconnects between the second outlet opening and the downstream side of the heat exchanger during an inside air suction mode where inside air is sucked into the upstream side of the blower unit; and
the outside air inlet opening is opened and the change means connects between the second outlet opening to the downstream side of the heat exchanger and disconnects between the second outlet opening and the upstream side of the blower unit during an outside air suction mode where the outside air is sucked into the upstream side of the blower unit.

6. The vehicle air conditioner according to claim 5, wherein:
the blower unit is disposed upstream of the heat exchanger, and
the blower unit is disposed within a width of the heat exchanger in a condition that a width direction of the heat exchanger is perpendicular to an airflow flowing through the heat exchanger.

7. The vehicle air conditioner according to claim 5, wherein:
the housing is disposed in an instrument panel that is disposed in a front part of the passenger compartment;
the blower unit is disposed within a front part of the housing; and
the heat exchanger is disposed within a rear part of the housing.

8. The vehicle air conditioner according to claim 5, wherein:
the first outlet opening is at least one of a face outlet opening where the conditioned air flows toward an upper body of a passenger in the passenger compartment and a foot outlet opening where the conditioned air flowing toward a foot of the passenger in the passenger compartment, and
the second outlet opening is a defroster outlet opening where the conditioned air flows toward an inside surface of a windshield.

9. The vehicle air conditioner according to claim 5, further comprising:
an auxiliary inside air inlet opening from which the inside air is sucked into the upstream side of the blower unit.

10. A vehicle air conditioner comprising:
a housing;
a partition that divides the housing into a first room and a second room;
a blower fan disposed in the first room, for blowing air;
a heat exchanger disposed in the second room, for exchanging heat with the air blown by the blower fan so that the air becomes conditioned air; and
a switching door that is disposed in the housing, wherein:
the housing includes
an outside air inlet opening from which outside air is sucked into the first room toward an upstream side of the blower fan,
a first outlet opening through which the conditioned air in the second room is blown toward a first space of the passenger compartment,
a second outlet opening through which the conditioned air in the second room is blown toward a second space of the passenger compartment,
a first passage that connects the second outlet opening to the first room, and
a second passage that connects the second outlet opening to the second room; and
the switching door changes conditions of the first passage and the second passage so that one of the first passage and the second passage is opened and the other is closed.

11. The vehicle air conditioner according to claim 10, wherein:
the housing has a first housing that has the first room and a separate second housing that has the second room, and
the first housing and the separate second housing are connected to each other.

* * * * *